United States Patent
Streit et al.

(10) Patent No.: US 10,937,088 B2
(45) Date of Patent: Mar. 2, 2021

(54) MOBILE ACCOUNT DATA ACCESS SYSTEMS AND METHODS

(71) Applicant: Green Dot Corporation, Pasadena, CA (US)

(72) Inventors: Steven William Streit, Pasadena, CA (US); Samuel Harris Altman, Mountain View, CA (US); Alok Deshpande, Mountain View, CA (US); David Kenneth Schreiber, Mountain View, CA (US)

(73) Assignee: Green Dot Corporation, Pasadena, CA (US)

( * ) Notice: Subject to any disclaimer, the term of this patent is extended or adjusted under 35 U.S.C. 154(b) by 12 days.

(21) Appl. No.: 15/957,836

(22) Filed: Apr. 19, 2018

(65) Prior Publication Data

US 2018/0308157 A1    Oct. 25, 2018

Related U.S. Application Data (63) Continuation of application No. 13/941,492, filed on Jul. 13, 2013, now abandoned.

(60) Provisional application No. 61/671,478, filed on Jul. 13, 2012.

(51) Int. Cl.
*G06Q 40/00* (2012.01)
*G06Q 40/02* (2012.01)

(52) U.S. Cl.
CPC .................. *G06Q 40/02* (2013.01)

(58) Field of Classification Search
CPC .................................................. G06Q 40/02
USPC ..................................... 705/16; 707/999.009
See application file for complete search history.

(56) References Cited

U.S. PATENT DOCUMENTS

| | | | |
|---|---|---|---|
| 4,804,984 A | 2/1989 | Heuer et al. |
| 4,939,662 A | 7/1990 | Nimura et al. |
| 5,086,394 A | 2/1992 | Shapira |
| 5,320,409 A | 6/1994 | Katoh et al. |
| 5,740,915 A | 4/1998 | Williams |
| 5,754,939 A | 5/1998 | Herz et al. |
| 5,758,313 A | 5/1998 | Shah et al. |
| 5,760,381 A | 6/1998 | Stich et al. |
| 5,777,305 A | 7/1998 | Smith et al. |
| 5,842,629 A | 12/1998 | Sprague et al. |
| D411,765 S | 7/1999 | Holihan |
| 5,918,909 A | 7/1999 | Fiala et al. |
| 5,975,302 A | 11/1999 | Young |
| 5,984,091 A | 11/1999 | Orr et al. |
| 6,014,090 A | 1/2000 | Rosen et al. |
| 6,049,711 A | 4/2000 | Ben-Yehezkel et al. |
| 6,052,122 A | 4/2000 | Sutcliffe et al. |

(Continued)

FOREIGN PATENT DOCUMENTS

| | | |
|---|---|---|
| EP | 1295500 B1 | 5/2009 |
| WO | 2001060100 | 8/2001 |

OTHER PUBLICATIONS

International Search Report and Written Opinion for International Application No. PCT/IB2008/02235, Search Completed Apr. 23, 2009, dated May 28, 2009, 7 pgs.

(Continued)

*Primary Examiner* — Samica L Norman
(74) *Attorney, Agent, or Firm* — KPPB LLP (57) ABSTRACT

Embodiments of mobile banking systems are described herein. Other examples and related methods are also disclosed herein.

16 Claims, 11 Drawing Sheets

(56) References Cited

U.S. PATENT DOCUMENTS

| | | | |
|---|---|---|---|
| 6,061,681 A | 5/2000 | Collins et al. | |
| 6,109,439 A | 8/2000 | Goade, Sr. | |
| 6,112,186 A | 8/2000 | Bergh et al. | |
| 6,185,545 B1 | 2/2001 | Resnick et al. | |
| 6,208,934 B1 | 3/2001 | Bechtolsheim et al. | |
| 6,224,108 B1 | 5/2001 | Klure | |
| 6,272,467 B1 | 8/2001 | Durand et al. | |
| 6,315,206 B1 | 11/2001 | Hansen et al. | |
| 6,317,718 B1 | 11/2001 | Fano | |
| 6,349,829 B1 | 2/2002 | Matheis et al. | |
| 6,366,568 B1 | 4/2002 | Bolgiano et al. | |
| 6,456,854 B1 | 9/2002 | Chern et al. | |
| 6,457,649 B1 | 10/2002 | Hileman | |
| 6,529,136 B2 | 3/2003 | Cao et al. | |
| 6,529,143 B2 | 3/2003 | Mikkola et al. | |
| 6,539,232 B2 | 3/2003 | Hendrey | |
| 6,549,768 B1 | 4/2003 | Fraccaroli | |
| 6,618,593 B1 | 9/2003 | Drutman et al. | |
| 6,639,905 B1 | 10/2003 | Müller et al. | |
| 6,687,608 B2 | 2/2004 | Sugimoto et al. | |
| 6,732,459 B1 | 5/2004 | Clark | |
| 6,819,919 B1 | 11/2004 | Tanaka | |
| 6,925,441 B1 | 8/2005 | Jones, III et al. | |
| 6,957,737 B1 | 10/2005 | Frederickson et al. | |
| 6,965,868 B1 | 11/2005 | Bednarek | |
| D512,456 S | 12/2005 | Diaz | |
| 7,039,423 B2 | 5/2006 | Daniel et al. | |
| 7,047,030 B2 | 5/2006 | Forsyth | |
| 7,071,842 B1 | 7/2006 | Brady, Jr. | |
| 7,082,365 B2 | 7/2006 | Sheha et al. | |
| 7,111,323 B1 * | 9/2006 | Bhatia | H04L 63/0815 707/999.009 |
| D532,452 S | 11/2006 | Heng | |
| 7,139,731 B1 | 11/2006 | Alvin | |
| 7,203,502 B2 | 4/2007 | Wilson et al. | |
| 7,203,674 B2 | 4/2007 | Cohen | |
| 7,236,799 B2 | 6/2007 | Wilson et al. | |
| 7,256,711 B2 | 8/2007 | Sheha et al. | |
| 7,271,742 B2 | 9/2007 | Sheha et al. | |
| 7,333,820 B2 | 2/2008 | Sheha et al. | |
| 7,363,027 B2 | 4/2008 | Hon et al. | |
| 7,392,935 B2 | 7/2008 | Byrne | |
| 7,486,958 B2 | 2/2009 | Sheha et al. | |
| 7,494,056 B2 | 2/2009 | Sturm | |
| 7,565,155 B2 | 7/2009 | Sheha et al. | |
| 7,593,740 B2 | 9/2009 | Crowley et al. | |
| 7,634,354 B2 | 12/2009 | Salmre | |
| 7,813,741 B2 | 10/2010 | Hendrey et al. | |
| 7,840,224 B2 | 11/2010 | Vengroff et al. | |
| 7,877,082 B2 | 1/2011 | Eagle et al. | |
| 7,917,154 B2 | 3/2011 | Fortescue et al. | |
| 7,978,900 B2 | 7/2011 | Nepomniachtchi et al. | |
| 8,000,726 B2 | 8/2011 | Altman et al. | |
| 8,023,963 B2 | 9/2011 | Yonker et al. | |
| 8,086,530 B2 | 12/2011 | Resnick et al. | |
| 8,099,109 B2 | 1/2012 | Altman et al. | |
| 8,181,789 B1 | 5/2012 | Kohler et al. | |
| 8,234,214 B2 | 7/2012 | Templeton et al. | |
| 8,275,699 B2 | 9/2012 | Shader et al. | |
| 8,352,367 B2 | 1/2013 | Templeton et al. | |
| 8,427,942 B2 | 4/2013 | Kim et al. | |
| 8,660,943 B1 | 2/2014 | Chirehdast | |
| 8,768,838 B1 | 7/2014 | Hoffman | |
| 8,977,568 B1 | 3/2015 | Schattauer et al. | |
| 8,989,778 B2 | 3/2015 | Pernikoff et al. | |
| 9,947,004 B2 | 4/2018 | Shankar et al. | |
| 10,706,405 B2 | 7/2020 | Shankar et al. | |
| 2001/0001321 A1 | 5/2001 | Resnick et al. | |
| 2002/0052786 A1 | 5/2002 | Kim et al. | |
| 2002/0077745 A1 | 6/2002 | Ohmura et al. | |
| 2003/0016804 A1 | 1/2003 | Sheha et al. | |
| 2003/0036848 A1 | 2/2003 | Sheha et al. | |
| 2003/0055983 A1 | 3/2003 | Callegari | |
| 2003/0060214 A1 | 3/2003 | Hendrey et al. | |
| 2003/0061211 A1 | 3/2003 | Shultz et al. | |
| 2003/0064705 A1 | 4/2003 | Desiderio | |
| 2003/0078035 A1 | 4/2003 | Sheha et al. | |
| 2003/0149527 A1 | 8/2003 | Sikila | |
| 2003/0150762 A1 | 8/2003 | Biller | |
| 2004/0030647 A1 | 2/2004 | Hansen | |
| 2004/0054428 A1 | 3/2004 | Sheha et al. | |
| 2004/0224703 A1 | 11/2004 | Takaki et al. | |
| 2005/0021560 A1 | 1/2005 | Yoon et al. | |
| 2005/0027543 A1 | 2/2005 | Labrou et al. | |
| 2005/0032527 A1 | 2/2005 | Sheha et al. | |
| 2005/0043060 A1 | 2/2005 | Brandenberg et al. | |
| 2005/0044409 A1 | 2/2005 | Betz et al. | |
| 2005/0054352 A1 | 3/2005 | Karaizman | |
| 2005/0073443 A1 | 4/2005 | Sheha et al. | |
| 2005/0075119 A1 | 4/2005 | Sheha et al. | |
| 2005/0101300 A1 | 5/2005 | Hon et al. | |
| 2005/0114527 A1 | 5/2005 | Hankey | |
| 2005/0159996 A1 | 7/2005 | Lazarus | |
| 2005/0166058 A1 | 7/2005 | Brokenshire et al. | |
| 2005/0171898 A1 | 8/2005 | Bishop et al. | |
| 2005/0197954 A1 | 9/2005 | Maitland et al. | |
| 2005/0216337 A1 | 9/2005 | Roberts et al. | |
| 2005/0250552 A1 | 11/2005 | Eagle | |
| 2005/0268254 A1 | 12/2005 | Abramson et al. | |
| 2005/0283620 A1 | 12/2005 | Khulusi et al. | |
| 2005/0289340 A1 | 12/2005 | Camenisch | |
| 2006/0027663 A1 | 2/2006 | Tang | |
| 2006/0036364 A1 | 2/2006 | Matsuo et al. | |
| 2006/0047825 A1 | 3/2006 | Steenstra et al. | |
| 2006/0064346 A1 | 3/2006 | Steenstra et al. | |
| 2006/0085443 A1 | 4/2006 | Pae | |
| 2006/0089160 A1 | 4/2006 | Othmer | |
| 2006/0186011 A1 | 8/2006 | Palmer | |
| 2006/0223518 A1 | 10/2006 | Haney | |
| 2006/0255154 A1 | 11/2006 | Newbrough et al. | |
| 2006/0270419 A1 | 11/2006 | Crowley et al. | |
| 2006/0278551 A1 | 12/2006 | Bianchini et al. | |
| 2007/0050129 A1 | 3/2007 | Salmre | |
| 2007/0112614 A1 | 5/2007 | Maga et al. | |
| 2007/0150414 A1 | 6/2007 | Templeton et al. | |
| 2007/0252009 A1 | 11/2007 | Kingsborough et al. | |
| 2007/0253712 A1 | 11/2007 | Katagiri et al. | |
| 2007/0278293 A1 | 12/2007 | Anderson et al. | |
| 2007/0281689 A1 | 12/2007 | Altman et al. | |
| 2007/0281690 A1 | 12/2007 | Altman et al. | |
| 2008/0022382 A1 | 1/2008 | Bradbury et al. | |
| 2008/0052182 A1 | 2/2008 | Marshall et al. | |
| 2008/0082424 A1 | 4/2008 | Walton | |
| 2008/0086414 A1 | 4/2008 | Ching | |
| 2008/0091535 A1 | 4/2008 | Heiser | |
| 2008/0103959 A1 | 5/2008 | Carroll et al. | |
| 2008/0109358 A1 | 5/2008 | Kottmeier et al. | |
| 2008/0132252 A1 | 6/2008 | Altman et al. | |
| 2008/0133322 A1 | 6/2008 | Kalia et al. | |
| 2008/0133336 A1 | 6/2008 | Altman et al. | |
| 2008/0188246 A1 | 8/2008 | Sheha et al. | |
| 2008/0195536 A1 | 8/2008 | Karns et al. | |
| 2008/0208697 A1 | 8/2008 | Kargman | |
| 2008/0227473 A1 | 9/2008 | Haney | |
| 2008/0237317 A1 | 10/2008 | Rosendall | |
| 2008/0270802 A1 | 10/2008 | Ashley | |
| 2009/0063286 A1 | 3/2009 | Rodriguez Porras | |
| 2009/0081989 A1 | 3/2009 | Wuhrer | |
| 2009/0090783 A1 | 4/2009 | Killian et al. | |
| 2009/0164366 A1 | 6/2009 | Blythe et al. | |
| 2009/0177375 A1 | 7/2009 | Jung et al. | |
| 2009/0254413 A1 | 10/2009 | Chang | |
| 2009/0298481 A1 | 12/2009 | Hurst | |
| 2010/0036770 A1 | 2/2010 | Fourez et al. | |
| 2010/0106568 A1 | 4/2010 | Grimes | |
| 2010/0106569 A1 | 4/2010 | Grimes | |
| 2010/0106577 A1 | 4/2010 | Grimes | |
| 2010/0106596 A1 | 4/2010 | Grimes | |
| 2010/0106598 A1 | 4/2010 | Grimes | |
| 2010/0211499 A1 | 8/2010 | Zanzot et al. | |
| 2010/0240352 A1 | 9/2010 | Suri et al. | |
| 2010/0306089 A1 | 12/2010 | Gelerman et al. | |
| 2010/0318489 A1 | 12/2010 | De Barros et al. | |
| 2011/0016048 A1 | 1/2011 | Lindqvist et al. | |

(56) References Cited

U.S. PATENT DOCUMENTS

| | | |
|---|---|---|
| 2011/0029434 A1 | 2/2011 | Templeton et al. |
| 2011/0035284 A1 | 2/2011 | Moshfeghi |
| 2011/0047619 A1 | 2/2011 | King et al. |
| 2011/0051665 A1 | 3/2011 | Huang |
| 2011/0099082 A1 | 4/2011 | Walker et al. |
| 2011/0208550 A1 | 8/2011 | Lamarche et al. |
| 2011/0208612 A1 | 8/2011 | Shader et al. |
| 2011/0208641 A1 | 8/2011 | Shader et al. |
| 2011/0208642 A1 | 8/2011 | Shader et al. |
| 2011/0208643 A1 | 8/2011 | Shader et al. |
| 2011/0208649 A1 | 8/2011 | Shader et al. |
| 2011/0225063 A1 | 9/2011 | Grunski et al. |
| 2011/0251892 A1 | 10/2011 | Laracey |
| 2011/0258122 A1 | 10/2011 | Shader |
| 2011/0270661 A1 | 11/2011 | Heiser, II et al. |
| 2011/0270756 A1 | 11/2011 | Tullis et al. |
| 2011/0275388 A1 | 11/2011 | Haney |
| 2011/0276374 A1 | 11/2011 | Heiser, II et al. |
| 2011/0276474 A1 | 11/2011 | Portillo |
| 2011/0313926 A1 | 12/2011 | Templeton et al. |
| 2012/0005085 A1 | 1/2012 | Pitroda |
| 2012/0022971 A1 | 1/2012 | Morris |
| 2012/0066081 A1 | 3/2012 | Shader |
| 2012/0095909 A1 | 4/2012 | Resnick et al. |
| 2012/0136789 A1 | 5/2012 | Kendrick et al. |
| 2012/0136790 A1 | 5/2012 | Templeton et al. |
| 2012/0150605 A1 | 6/2012 | Isaacson et al. |
| 2012/0246019 A1 | 9/2012 | Wolfe |
| 2012/0292206 A1 | 11/2012 | Casella et al. |
| 2012/0296813 A1 | 11/2012 | Templeton et al. |
| 2012/0296814 A1 | 11/2012 | Templeton et al. |
| 2012/0310833 A1 | 12/2012 | Templeton et al. |
| 2013/0006785 A1 | 1/2013 | Perkins |
| 2013/0041729 A1 | 2/2013 | Shader |
| 2013/0041741 A1 | 2/2013 | Shader |
| 2013/0073403 A1* | 3/2013 | Tuchman .............. G06Q 20/20 705/16 |
| 2013/0144734 A1 | 6/2013 | Perkins |
| 2013/0144789 A1 | 6/2013 | Aaltonen et al. |
| 2013/0204925 A1 | 8/2013 | McDougall et al. |
| 2013/0291127 A1 | 10/2013 | Bergman et al. |
| 2013/0317923 A1 | 11/2013 | Capps |
| 2014/0006191 A1 | 1/2014 | Shankar et al. |
| 2014/0012648 A1 | 1/2014 | Grimes |
| 2014/0012690 A1 | 1/2014 | Capps |
| 2014/0019322 A1 | 1/2014 | Streit et al. |
| 2014/0058837 A1 | 2/2014 | Grimes |
| 2014/0115710 A1 | 4/2014 | Hughes |
| 2014/0122684 A1 | 5/2014 | Brentano |
| 2014/0180819 A1 | 6/2014 | Grimes |
| 2015/0081565 A1 | 3/2015 | Roullier et al. |
| 2015/0101062 A1 | 4/2015 | Silver et al. |
| 2015/0142655 A1 | 5/2015 | Ghosh et al. |
| 2015/0180736 A1 | 6/2015 | Leung |
| 2015/0193873 A1 | 7/2015 | Hammock et al. |
| 2015/0199725 A1 | 7/2015 | Aaltonen et al. |
| 2015/0206137 A1 | 7/2015 | Mazarim et al. |
| 2016/0071083 A1 | 3/2016 | Apps |
| 2016/0189213 A1 | 6/2016 | Gopalan et al. |
| 2016/0189229 A1 | 6/2016 | Gopalan et al. |
| 2016/0189230 A1 | 6/2016 | Gopalan et al. |
| 2016/0189292 A1 | 6/2016 | Deshpande et al. |
| 2016/0342967 A1 | 11/2016 | Proctor et al. |
| 2016/0379211 A1 | 12/2016 | Hoyos et al. |
| 2017/0024731 A1 | 1/2017 | Gullett et al. |
| 2017/0039551 A1 | 2/2017 | Driggs et al. |
| 2017/0053276 A1 | 2/2017 | Gullett et al. |
| 2017/0097996 A1 | 4/2017 | Gullett et al. |
| 2018/0268396 A1 | 9/2018 | Shankar et al. |
| 2019/0095989 A1 | 3/2019 | Archer et al. |

OTHER PUBLICATIONS

International Search Report and Written Opinion for International Application No. PCT/US2007/012960, Search Completed Dec. 13, 2007, dated Jan. 3, 2008, 7 pgs.

International Search Report and Written Opinion for International Application No. PCT/US2009/049956, Search Completed Aug. 24, 2009, dated Sep. 1, 2009, 6 pgs.

Bahl, P. et.al., "RADAR: An In-Building RF-based User Location and Tracking System", Proceedings of IEEE INFOCOM 2000, vol. 2, Tel-Aviv, Israel, Mar. 2000, pp. 775-784.

Chintalapudi, Krishna K., "Indoor Localization Without the Pain, in Mobicom," Association for Computing Machinery, Inc., Sep. 2010, 12 pgs.

Duckham et al., "Location Privacy and Location-aware computing" 2005, 20 pgs.

Eriksson, Jakob et.al. , "Cabernet: Vehicular Content Delivery Using WiFi." MIT CSAIL MOBICOM 2008, 13 pgs.

Fiercewireless, "Sprint offers Loopt's social mapping service", Internet Article, [Online] Jul. 17, 2007, Retrieved from Internet at http://fiercewireless.com/story/sprint-offers-loopts-social-mapping-service/7/17/07, 1 page.

Non-Final Office Action in U.S. Appl. No. 11/445,727, dated Jul. 25, 2008, 12 pgs.

Non-Final Office Action in U.S. Appl. No. 11/445,729, dated Jun. 9, 2008, 12 pgs.

Non-Final Office Action in U.S. Appl. No. 11/445,751, dated Jul. 10, 2008. 9 pgs.

Ji, Y. et.al., "ARIADNE: A Dynamic Indoor Signal Map Construction and Localization System", In MobiSys, 2006, 14 pgs.

Karouia et al., "Video Similarity Measurement Based on Attributed Relational Graph Matching", N.T. Nguyen, R. Katarzyniak (Eds.): New Challenges in Applied Intelligence Technologies, SCI 134, pp. 173-182, 2008., 2008, 10 pgs.

LAT49, "screen capture of http://lat49.com/howitworks/index.php", Jun. 12, 2009, 2 pgs.

Madigan, D. et. al. , "Bayesian Indoor Positioning Systems", In Infocom, 2005, 11 pgs.

"Non-Final Office Action in U.S. Appl. No. 11/445,730, dated Apr. 29, 2009" 14 pgs.

"Non-Final Office Action in U.S. Appl. No. 11/881,836, dated Jul. 23, 2009" 22 pgs.

Schreiner, Keri, "Where We At? Mobile Phones Bring GPS to the Masses", IEEE Computer Graphics and Applications vol. 27, No. 3, May 2007-Jun. 2007, pp. 6-11.

secretadmirer.com, "screen capture using http://web.archive.org of http://secretAdmirer.com website", Dec. 2, 1998, 2 pgs.

Youssef, M. et.al., "The Horus WLAN Location Determination System", In MobiSys, 2005, 14 pgs.

"Method for Avoiding and Repairing Damage to Distributed Transactions in a Coordinated Resource Recovery System", IBM Technical Disclosure Bulletin, 1991, vol. 33, Issue 10A, pp. 362-366.

\* cited by examiner

MOBILE ACCOUNT DATA ACCESS SYSTEMS AND METHODS

CROSS-REFERENCE TO RELATED APPLICATION

The current application claims priority as a continuation of U.S. patent application Ser. No. 13/941,492 filed Jul. 13, 2013, entitled "Mobile Banking Systems and Related Methods", which claims priority under 35 U.S.C. § 119(e) to U.S. Provisional Patent Application No. 61/671,478 filed Jul. 13, 2012, entitled "Method and System for Online Mobile Banking" the disclosure of which is incorporated by reference herein in its entirety.

TECHNICAL FIELD

The present disclosure relates generally to banking systems, and relates, more particularly, to mobile banking systems and related methods.

BACKGROUND

The popularity and widespread use of mobile devices, such as smartphones, has opened new gateways from which to engage in banking transactions, Because of the sensitive nature of information contained in bank accounts, however, strenuous security and authentication features are required to permit safe banking transactions through such mobile devices. Such security can come at a convenience cost in terms of repeated required authentications to access specific non-critical data about such bank accounts.

Considering the above, further developments can be made to ease access to such specific non-critical data without compromising the security of the bank accounts.

BRIEF DESCRIPTION OF THE DRAWINGS

The present disclosure will be better understood from a reading of the following detailed description of examples of embodiments, taken in conjunction with the accompanying figures in the drawings.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular hierarchical, sequential, or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" an the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DESCRIPTION

In one embodiment, a system for mobile banking can comprise a mobile module for providing access to a first bank account of a user. The mobile module can comprise a login module and a main account module accessible via the login module and configured to at least one of receive a first account balance of the first bank account and further account information about the first bank account, or request one or more transactions for the first bank account. The mobile module can also comprise a quick-balance module accessible separate from the main account module and configured to receive a first account balance of the first bank account and to provide a first quick-balance report of the first account balance. The login module can be configured to receive initial authentication of the user to enable initial access to the main account module and to the quick balance module for the first bank account, and to receive subsequent authentication of the user for subsequent access to the main account module. The mobile module can impede the subsequent access to the main account module until receipt of the subsequent authentication of the user via the login module. In addition, the mobile module can permit access to the quick-balance report of the quick-balance module without requiring the subsequent authentication of the user.

In one implementation, a method for facilitating mobile banking can comprise providing a mobile module for mobilely interfacing with a first bank account. Providing the mobile module can comprises providing a login module, providing a main account module accessible via the login module, and providing a quick-balance module accessible separate from the main account module. The login module can be configured to receive user initial authentication for initial access to the main account module and to the quick balance module for the first bank account, and to receive user subsequent authentication for subsequent access to the main account module. The main account module can be configured to at least one of receive a first account balance of the first bank account and further account information about the first bank account, or request one or more transactions for the first bank account. The quick-balance module can be configured to receive the first account balance for the first bank account and to provide a first quick-balance report of the first account balance. The mobile module can be configured to impede the subsequent access to the main account module until receipt of the user subsequent authentication via the login module. Furthermore, the mobile module can be configured to permit access to the quick-balance report of the quick-balance module without requiring the user subsequent authentication.

Other examples and embodiments are further disclosed herein. Such examples and embodiments may be found in the figures, in the claims, and/or in the present description.

Figure 1:
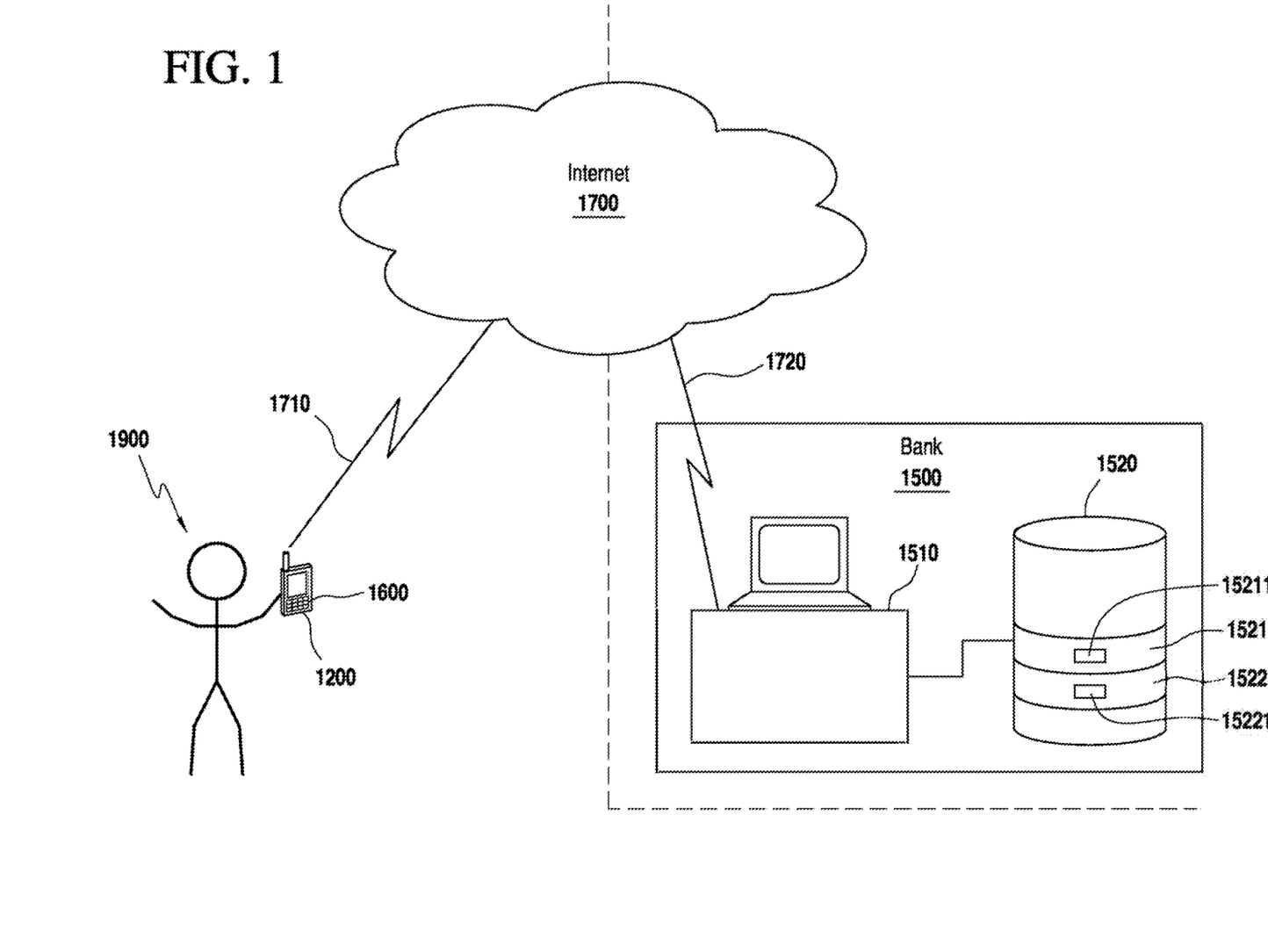
FIG. 1 illustrates a diagram of a mobile banking system comprising a mobile module for permitting a user to communicate remotely with a bank server.

Turning to the drawings, FIG. 1 illustrates a diagram of mobile banking system 100, comprising mobile module 1600 for permitting user 1900 to communicate remotely with bank server 1510 of banking institution 1500. In the present embodiment, mobile module 1600 is implemented via mobile device 1200, which is associated with user 1900 and can be, for instance a portable or handheld electronic device such as a cellular phone, a smartphone, a personal digital assistant (PDA), and/or a tablet device. For instance mobile device 1200 can be an electrical device manufactured by Research in Motion Limited (e.g., a Blackberry® device), Palm, Inc. (e.g., a Palm® device), Apple Computer, Inc. (e.g., an iPod® MP3 player, an iPod Touch® device, an iPad® device, and/or iPhone® device), Samsung Electronics Co. Ltd.(e.g., a Galaxy® device). In other examples, portable electronic device 1100 can be a portable computer.

Mobile device 1200 can be configured to establish wireless connection 1710 with Internet 1700. Similarly, bank server 1510 of banking institution 1500 can be configured to communicate via Internet 1700 through connection 1720, which may be wired or wireless. Thus, mobile device 1200 and bank server 1510 can communicate via Internet 1700. In some examples, a portion of connection 1710 and/or of connection 1720 can be carried out via a network configured for a wireless and/or cellular standard such as WiFi (IEEE 802.11a/b/g/n), WiPAN (IEEE 802.15, Bluetooth®), W-CDMA (Wideband Code Division Multiple Access), HSPA (High Speed Packet Access), EDGE (Enhanced Data Rate for GSM Evolution), WIMAX (Worldwide Interoperability for Microwave Access), LTE (Long Term Evolution), etc.

Figure 2:
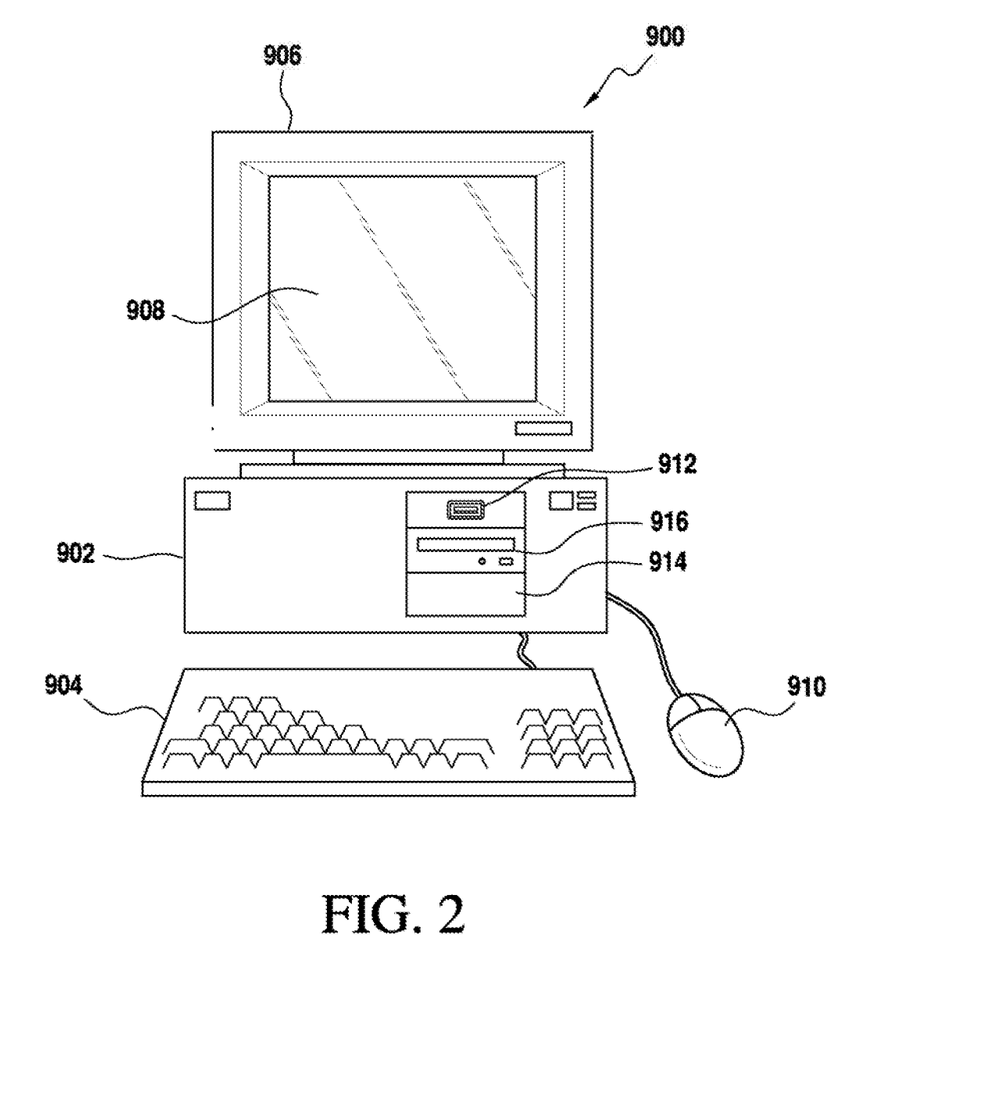
FIG. 2 illustrates a computer suitable for implementing an embodiment of the bank server
Figure 3:
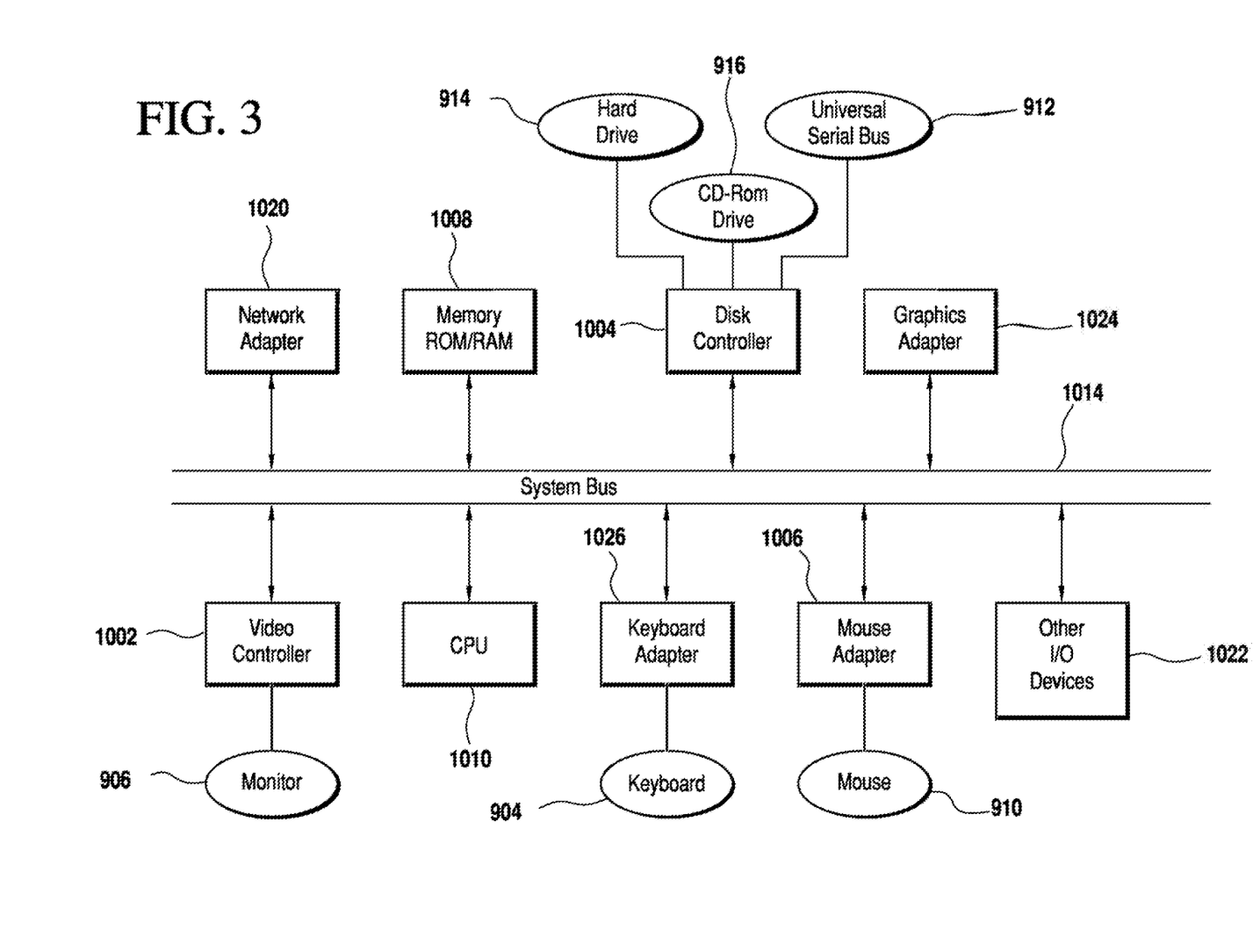
FIG. 3 illustrates a representative block diagram of elements of the computer of FIG. 2.

FIG. 2 illustrates a computer 900 suitable for implementing an embodiment of bank server 1510. Computer 900 includes a chassis 902 containing one or more circuit boards (not shown), a USB (universal serial bus) port 912, a Compact Disc Read-Only Memory (CD-ROM) and/or Digital Video Disc (DVD) drive 916, and a hard drive 914. A representative block diagram of the elements included on the circuit boards inside chassis 902 is shown in FIG. 3. A central processing unit (CPU) 1010 is coupled to a system bus 1014 in FIG. 3. In various embodiments, the architecture of CPU 1010 can be compliant with any of a variety of commercially distributed architecture families.

System bus 1014 also is coupled to memory 1088 that includes both read only memory (ROM) and random access memory (RAM). Non-volatile portions of memory 1008 or the ROM can be encoded with a boot code sequence suitable for restoring computer 900 (FIG. 2) to a functional state after a system reset. In addition, memory 1008 can include microcode such as a Basic Input-Output System (BIOS). In the depicted embodiment of FIG. 3, various I/O devices such as a disk controller 1004, a graphics adapter 1024, a video controller 1002, a keyboard adapter 1026, a mouse adapter 1006, a network adapter 1020, and other I/O devices 1022 can be coupled to system bus 1014. Keyboard adapter 1026 and mouse adapter 1006 are coupled in the present example to keyboard 904 and mouse 910, respectively, of computer 900. While graphics adapter 1024 and video controller 1002 are indicated as distinct units in FIG. 3, video container 1002 can be integrated into graphics adapter 1024, or vice versa in other embodiments. Video controller 1002 is suitable for refreshing monitor 906 to display images on a screen 908 of computer 900. Disk controller 1004 can control hard drive 914, USB port 912, and/or CD-ROM or DVD drive 916. In other embodiments, distinct units can be used to control each of these devices separately.

Network adapters 1020 can be coupled to one or more antennas. In some embodiments, network adapter 1020 can be configured for WiFi communication (IEEE 802.11), and/or may be part of a WNIC (wireless network interface controller) card (not shown) plugged or coupled to an expansion port (not shown) in computer 900. Such WNIC card can be a wireless network card built into internal computer 900 in some examples. A wireless network adapter can be built into internal client computer 900 by having wireless Ethernet capabilities integrated into the motherboard chipset, or implemented via a dedicated wireless Ethernet chip, connected through the PCI (peripheral component interconnector) or a PCI express bus. In the same or other embodiments, network adapters 1020 can be configured for communication via other wireless protocols, such as via WPAN, W-CDMA, HSPA, EDGE, WiMAX, LTE, or others. In other embodiments, network adapter 1020 can be a wired network adapter.

Although other components of computer 900 are not shown, such components and their interconnection are well known to those of ordinary skill in the art. Accordingly, further details concerning the construction and composition of computer 900 and the circuit boards inside chassis 902 need not be discussed herein.

When computer 900 is in operation, program instructions stored on hard drive 914, on memory 1008, on a USB drive in USB port 912, and/or on a CD-ROM or DVD in CD-ROM and/or DVD drive 916, can be executed by CPU 1010 (FIG. 3). Such program instructions may correspond to an operating system (OS) such as a Microsoft Windows OS, a Linux OS, and/or a UNIX OS, among others. A portion of such program instructions can be suitable for implementing or carrying out the systems and methods described herein.

In the present example of FIG. 1, bank server 1510 is coupled to database 1520, which can be similar to a memory device of computer 900 (FIGS. 2-3) such as hard disk 914. Bank server 1510 and database 1520 can comprise a single unit in some implementations, or can be separate from each other as illustrated in FIG. 1. Database 1520 comprises bank accounts 1521-1522, which in the present example are bank accounts of or associated with user 1900. Mobile module 1600 can be configured to communicate with bank server 1510 to permit user 1600 to access bank accounts 1521 and/or 1522.

Figure 4:
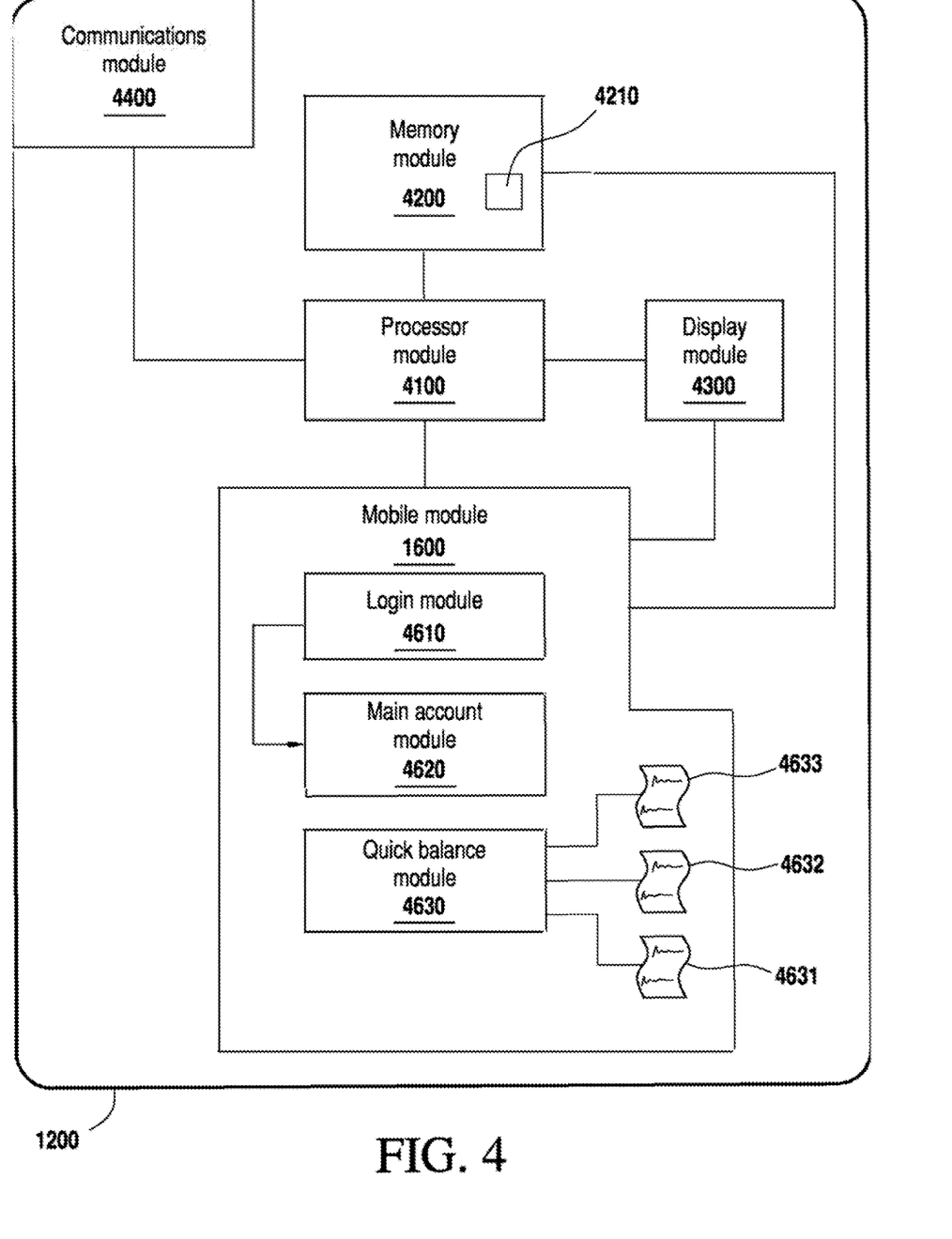
FIG. 4 illustrates a sample schematic of a mobile device at which the mobile module can be implemented.

FIG. 4 illustrates a sample schematic of mobile device 1200. Mobile device 1200 comprises processor module 4100 and memory module 4200 coupled together to run mobile device 1200. Memory module 4200 can comprise an operating system which can be accessed therefrom for execution by processor module 4100 to operate different functions of mobile device 1200. In some examples, the operating system can comprise an operating system like an iOS® OS from Apple Computer Inc., Android® OS from Google, Inc., and/or a Windows Phone OS), from Microsoft, Inc., among others. Mobile device 1200 also comprises display module 4300 coupled to processor module 4100 and configured to present one or more user interfaces for the operation of mobile device 1200. Processor module 4100 is also coupled to communications module 4400, which can be configured to establish connection 1710 (FIG. 1) via one or more of the wireless standards described above.

Mobile module 1600 is also shown in FIG. 4 as implemented in mobile device 1200, and can be coupled to or accessed by processor module 4100 and/or display module 4300. Although shown separate from memory module 4200 in FIG. 4, mobile module 1600 can be coupled to and/or stored at memory module 4200 in some embodiments. For instance, mobile module 1600 can comprise a mobile application (mobile app) which may be downloaded via Internet 1700 from a website or an online application store, and/or which may be stored at mobile device 1200.

As shown in FIG. 1, mobile module 1600 can be configured to provide user 1900 with access to bank account 1521 and/or 1522 at banking institution 1500 via Internet 1700 through connection 1710 between mobile device 1200 and Internet 1700 and through connection 1720 between Internet 1700 and bank server 1510. Mobile module 1600 can thus enable user 1900 to engage in mobile banking transactions for bank accounts 1521 and/or 1522. Such banking transactions can comprise, for example, the review of bank account balances, requests for transfers of funds between accounts, and/or photo-check deposits, among others.

As seen in FIG. 4, mobile module 1600 can comprise several sub-modules, such as login module 4610, main account module 4620, and quick-balance module 4630. Both main account module 4620 and quick-balance module 4630 can provide information about bank accounts 1521 and/or 1522, but main account module 4620 is configured to provide more information or greater functionality with respect to bank accounts 1521 and/or 1522 than quick-balance nodule 4630, which can be limited to provide more basic information such as an account balance.

Login module 4610 (FIG. 4) can be configured to receive authentication information from a user, like user 1900 (FIG. 1), to confirm the user's identity prior to providing access to accounts 1521 and/or 1522 via main account module 4620. The authentication information can comprise a username and/or a password or personal identification number (PIN) in some examples.

Main account module 4620 (FIG. 4) is accessible via login module 4610, and can comprise one or more account operation modules that can, for example, receive account balance 15211 of bank account 1521 or account balance 15221 of bank account 1522, and/or further account information about bank account 1521 or bank account 1522. Main account module 4620 can also request one or more transactions for bank account 1521 and/or 1522 (FIG. 1). For instance, as part of the further account information, main account module 4620 (FIG. 4) can be configured to receive, from bank server 1510 (FIG. 1), information about individual transactions throughout a certain time period for bank account 1521 and/or 1522. As another example, main account module can transmit to bank server 1510 one or more account transaction requests, such as balance transfer requests or deposit requests, as received from user 1900 for bank account 1521 and/or 1522.

Quick-balance nodule 4630 (FIG. 4) is accessible separate from main account module 4620, and can be configured to receive an account balance from bank server 1510, such as account balance 15211 of bank account 1521, and/or account balance 15221 of bank account 1522 (FIG. 1). Quick-balance module 4630 can also be configured to provide one or more quick-balance reports 4631 comprising or based on account balance 15211 and/or 15221, as described further below.

Figure 5:
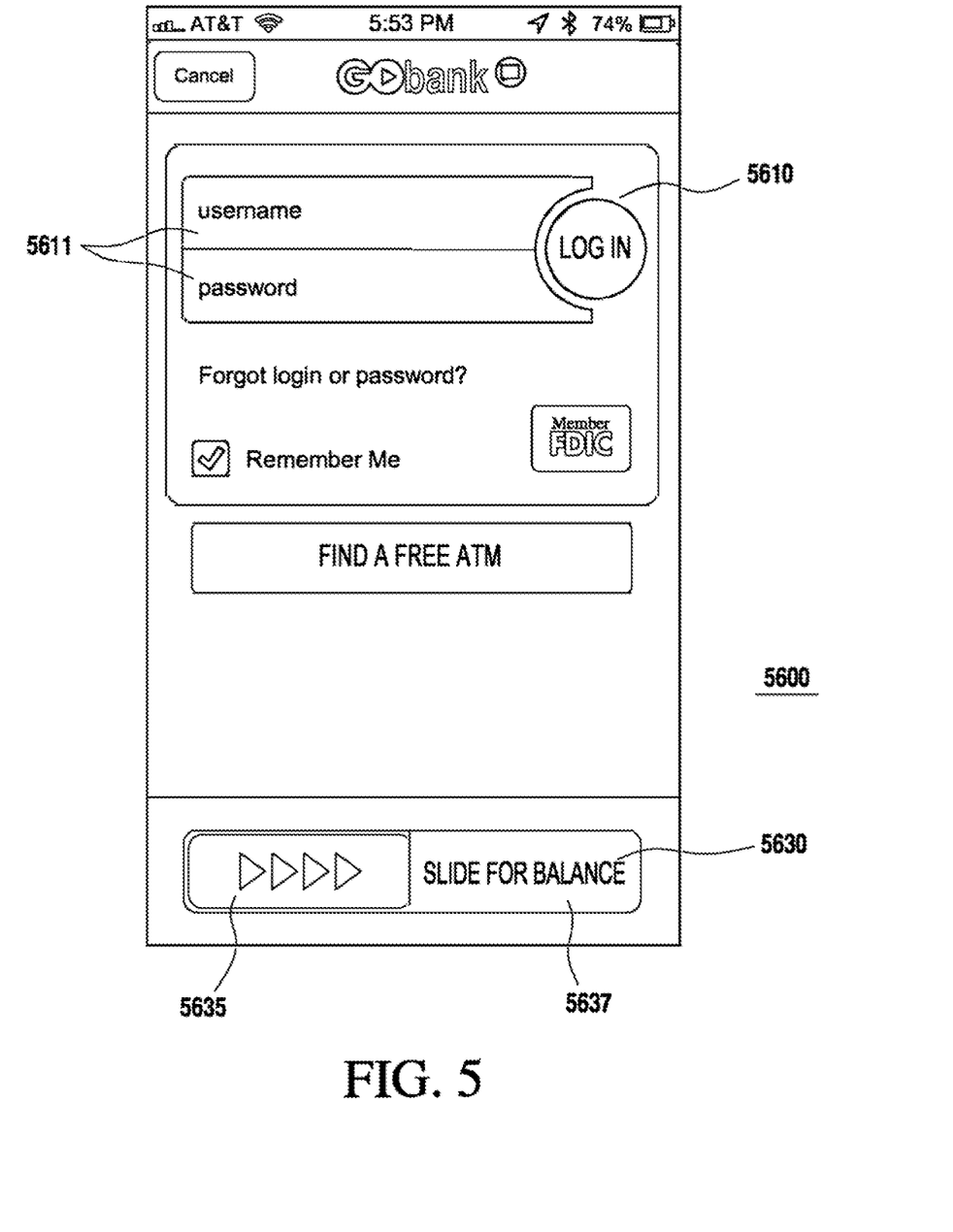
FIG. 5 illustrates a front display comprising a login interface and a quick-balance interface.

FIG. 5 illustrates front display 5600 comprising login interface 5610 and quick-balance interface 5630. Front display 5600 can be presented, for example, once mobile module 1600 is activated when an icon corresponding to mobile module 1600 is selected by user 1900. Quick-balance interface 5630 is configured to present quick balance report 4631 of quick balance module 4630 (FIG. 4) when actuated.

The illustration of FIG. 5 shows front display 5600 as it appears upon initial activation of mobile module 1600, such as when mobile module 1600 is first used and prior to any login of any user. Accordingly, login interface 5610 is thus configured to receive initial authentication 5611 of user 1600 (FIG. 1) to enable initial access to main account module 4610 and to quick balance module 4630 for bank account 1521 and/or 1522.

Figure 6:
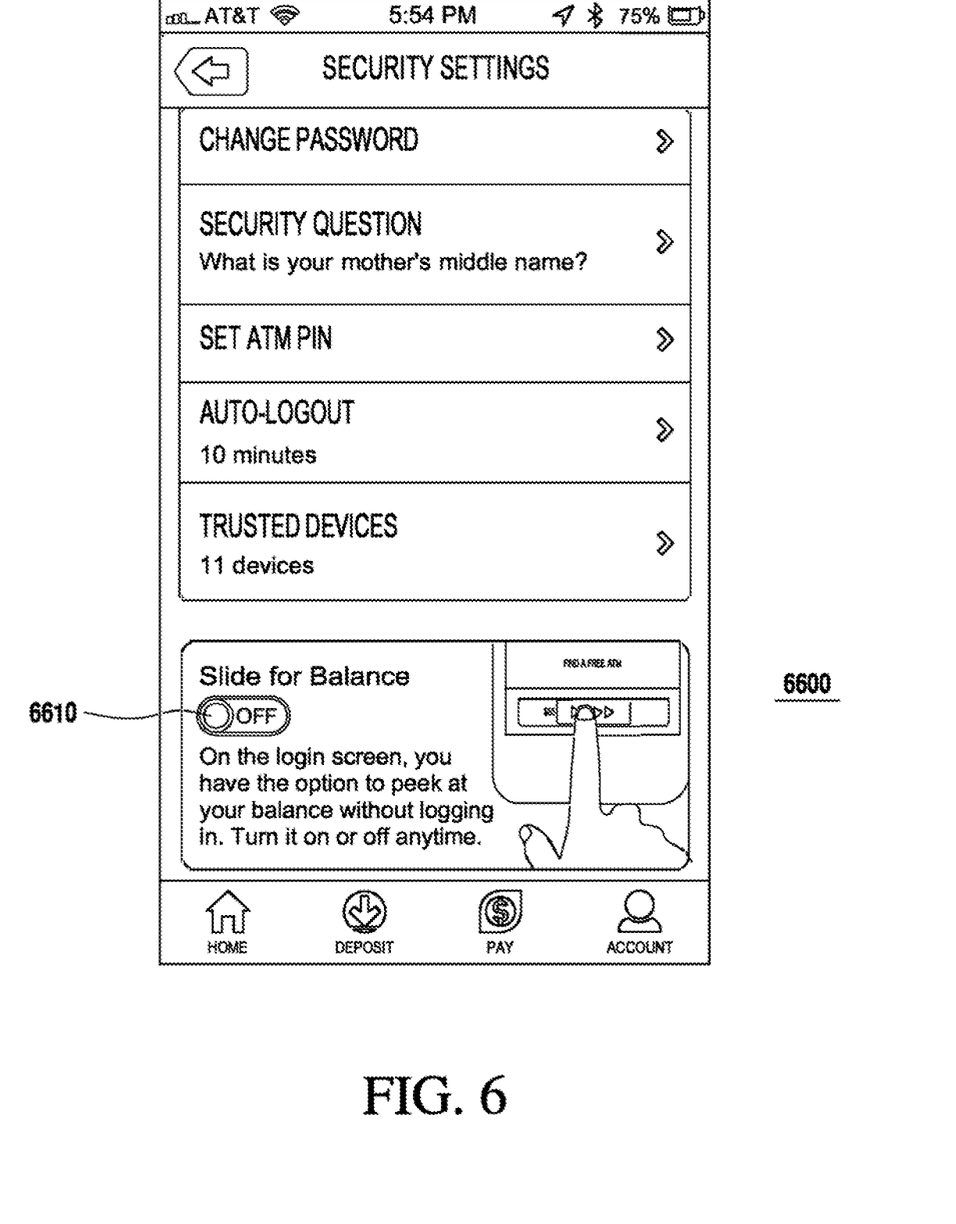
FIG. 6 illustrates a security settings display of the mobile module.

Quick-balance interface 5630 will not present quick balance report 4631 until the user has enabled quick-balance module 4630 and/or quick-balance interface 5630 as a feature after successfully logging in via initial authentication 5611. For instance, FIG. 6 illustrates security settings display 6600 of mobile module 1600, which is accessible to user 1900 once logged-in to mobile module 1600, and which comprises quick-balance enablement interface 6610. Thus, mobile module 1600 can receive user input from user 1900 via quick-balance enablement interface 6610 to enable quick-balance interface 5630 and thereby permit quick-balance module 4630 to provide quick-balance report 4631 via quick-balance interface 5630 without requiring subsequent authentication from user 1900. In some examples, if user 1900 tries to actuate quick-balance interlace 5630 prior to enabling it and/or prior to successfully logging in via initial authentication 5611, mobile module 1600 may present a message prompting user 1900 to log in and enable quick-balance module 4630 and/or quick-balance interface 5630.

There can be embodiments where, when user 1900 enables quick-balance module 4630 as described above, an authentication token can be enabled for permitting quick-balance module 4630 to provide reports such as quick balance report 4631. In some examples, such authentication token can be similar to authentication token 4210 (FIG. 4), which can be generated by mobile module 1600 or can be received from bank server 1510. In the present example, authentication token 4210 is stored at memory module 4200 of mobile device 1200, but there can be other examples where authentication token 4210 can be stored at bank database 1520 and associated with bank account 1521 and/or 1522. Mobile module 1600 will thus provide quick balance report 4631 via quick-balance module 4630 and/or quick-balance interface 5630 only if the authentication token is enabled as described above.

Figure 7:
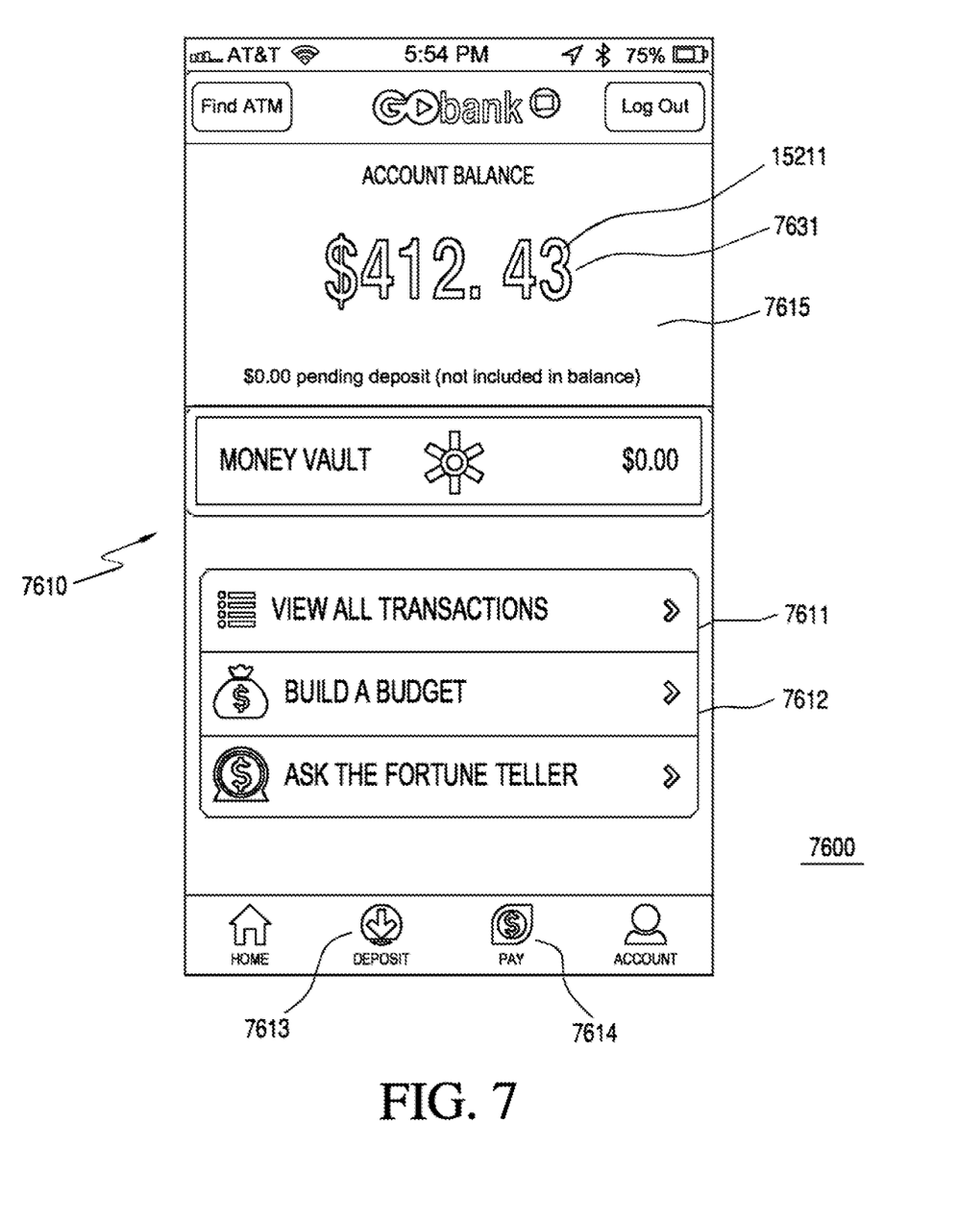
FIG. 7 illustrates a main display comprising a main a account interface of the mobile module.

FIG. 7 illustrates main display 7600 comprising main interface 7610 of mobile module 1600. Once user 1900 has logged-in to mobile module 1600 via login interface 5610 (FIG. 5), main display 7600 of mobile module 1600 can be presented via display module 4300 (FIG. 4) so that user 1900 can interface with main account module 4620 (FIG. 4) via main interface 7610. Main interface 7610 comprises several tools for interfacing with main account module 4620 so that main account module 4620 can receive information and/or request transactions with respect to bank account 1521 through bank server 1510 (FIG. 1). For example, main interface 7610 comprises transactions interface 7611 configured to present transaction details of the different transactions of bank account 1521 with respect to a time period. Budget interface 7612 is configured to present budgeting information and/or to permit budget planning with respect to bank account 1521. Deposit interface 7613 is configured to permit the user to deposit a check into bank account 1521, such as via a photo-check deposit where a picture of the deposit check is sent to bank server 1510 for processing and deposit. Payment interface 7614 is configured permit the user to select a payee and to transmit a request to bank server 1510 to send a payment to the payee out of bank account 1521. Main balance interface 7615 is configured to present main balance report 7631 comprising at least account balance 15211 of bank account 1521. Main balance report 7631 can also comprise further information, such as a summary of pending deposit(s) not included in account balance 15211. In some embodiments, main account module 4620 can provide the user with another interface similar to main interface 7610 but configured with respect to bank account 1522 rather than bank account 1521.

Figure 8:
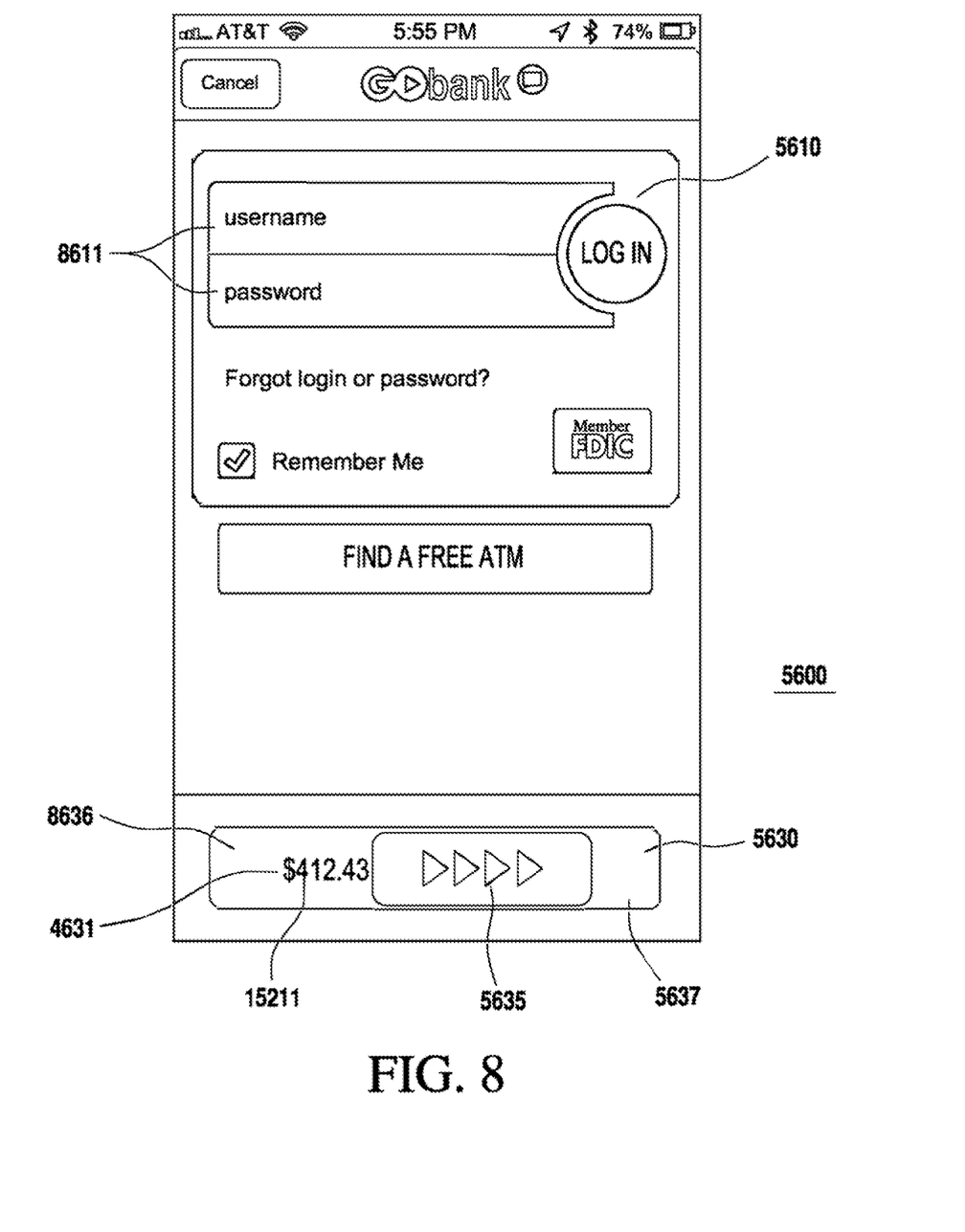
FIG. 8 illustrates the front display of FIG. 5 with the quick-balance interface revealing a quick-balance report.

Once user 1900 has successfully logged-in via initial authentication 5611 (FIG. 5) and has enabled quick-balance module 4630 and/or quick-balance interface 5630 via quick-balance enablement interface 6610 (FIG. 6), user 1900 can eventually log off mobile module 1600, whether intentionally or automatically after a time-out period. Accordingly, when mobile module 1600 is subsequently called at a later time, front display 5600 will be presented with quick balance interface 5630 along with login interface 5610 requesting subsequent authentication 8611, as shown in FIG. 8. In other embodiments, quick balance interface 5630 and login interface 5610 need not be presented together. In any event, mobile module 1600 will impede subsequent access to main account module 4620 until receipt of subsequent authentication 8611 for login of user 1900 via login interface 5610. In contrast, mobile module 1600 will permit access to quick balance module 4630 (FIG. 4), without requiring subsequent authentication 8611 of user 1900, if user 1900 previously enabled such feature via quick-balance enablement interface 6610 (FIG. 6). Such a feature can save time and effort for user 1900 if a quick glance at account balance 15211 is needed, and would not permit any unauthorized user to access more sensitive information and/or to request transactions with respect to account 1521 and/or 1522. Quick-balance interface 5630, as shown in FIGS. 5 and 8, presents only account balance 15211 for bank account 1521 and thereby conceals other information which may be more sensitive. Nevertheless, there can be other embodiments where further information about bank account 1521 can be presented by quick-balance interface 5630, such as an account identifier that may comprise a portion of the account number and/or an account nickname. In some examples, such an account identifier can be similar to account identifier 9731 as described below with respect to FIG. 9.

As seen in the examples of FIGS. 5 and 8, quick-balance interface 5630 comprises actuator 5635 configured to conceal quick-balance repot 4631 when actuator 5635 is not actuated, and to reveal quick-balance report 4631 when actuator 5635 is actuated. In the present embodiment actuator 5635 comprises a slideblock that reveals quick-balance report 4631 when actuated by a sliding gesture. For instance, FIG. 5 shows the slideblock of actuator 5635 prior to actuation and thus concealing quick-balance report 4631, while FIG. 8 shows the slideblock 5635 being actuated by sliding, and revealing quick-balance report 4631 as it is slid. More specifically, for the present embodiment, quick-balance interface 5630 comprises bottom interface layer 8636 comprising quick balance report 4631, and top interface layer 5637 covering bottom interface layer 8636 and quick-balance report 4631 thereat. Thus, as seen in FIG. 8, the slideblock of actuator 5635 removes top interface layer 5637, as actuator 5635 is slid, to reveal quick-balance report 4631 at bottom interface layer 8636. There can be other embodiments where actuator 5636 need not comprise a slideblock or operate by sliding. For instance, in other embodiments, actuator 5636 can be configured as a button that reveals quick-balance report 4631 when actuated by a pressing gesture. As another example, actuator 5636 can be actuated by a screen-pull gesture that grabs, drags, or otherwise displaces front display 5600 or at least a portion thereof to reveal quick-balance report 4631.

Figure 9:
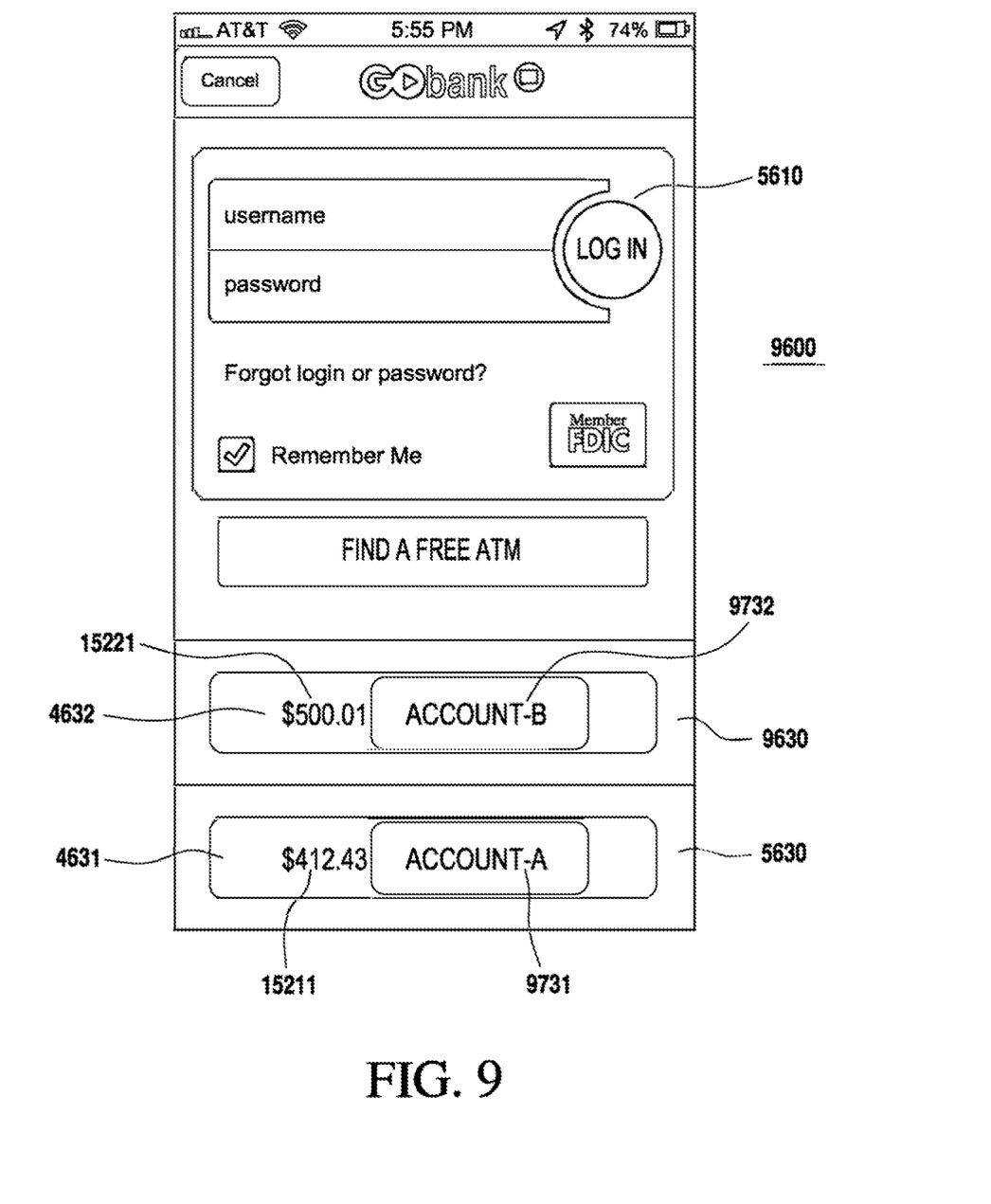
FIG. 9 illustrates a front display comprising dual quick-balance interface for different bank accounts.

There can also be embodiments where quick-balance module 4630 (FIG. 4) can be configured to provide quick balance reports for more than one bank account, and where mobile module 1600 can comprise quick-balance interfaces configured to handle more than one bank account. For instance, as seen in FIG. 4, quick-balance module 4630 can be configured to provide quick-balance report 4632 in addition to quick-balance report 4631, where quick-balance report 4631 can be correlated to account balance 15211 of bank account 15221, and quick-balance report 4632 can be correlated to account balance 15221 of bank account 1522 (FIG. 1). FIG. 9 illustrates front display 9600 of mobile module 1600, which can be similar to front display 5600 (FIGS. 5, 8), but further comprises quick-balance interface 9630 similar to quick-balance interface 9630 but configured to present quick-balance report 4632 of bank account 1522. To prevent confusion of the user with respect to quick-balance interfaces 5630 and 9630, front display 9600 further comprises account identifier 9731 to identify quick-balance interface 5630 with respect to bank account 1521, and also comprises account identifier 9732 to identify quick-balance interface 9630 with respect to bank account 1522.

Figure 10:
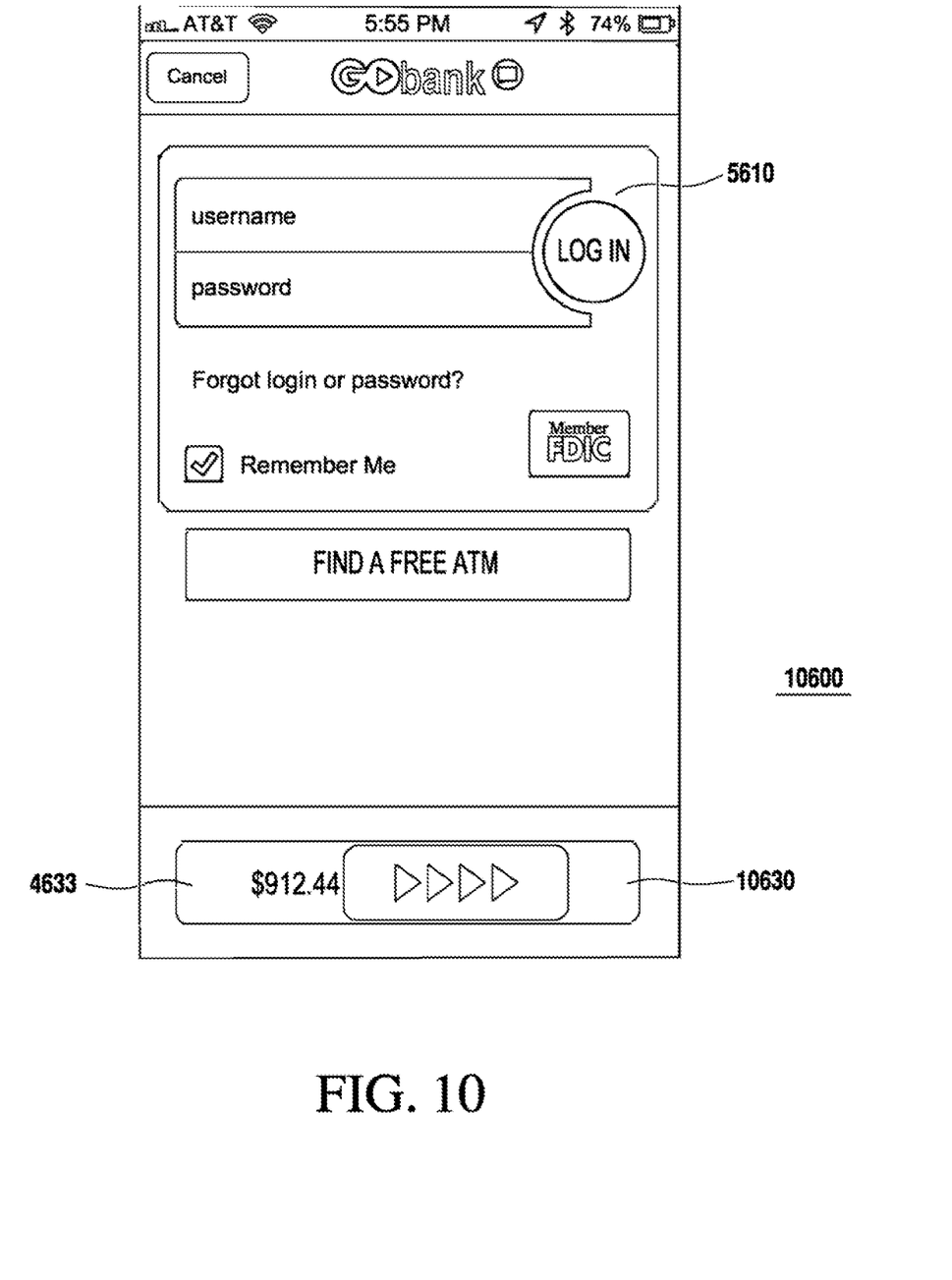
FIG. 10 illustrates a front display comprising a combine quick-balance interface for a combined quick-balance report of multiple bank accounts.

FIG. 10 illustrates front display 10600 of mobile module 1600, which can be similar to front display 5600 (FIGS. 5, 8) and/or front display 9600 (FIG. 9). Front display 10600 comprises quick-balance interface 10630, which can be similar to quick-balance interface 5630 (FIGS. 5, 8), but is configured to present quick-balance report 4633 instead, where quick-balance report 4633 comprises a combined balance of account balances 15211 and 15221 of respective bank accounts 1521 and 1522 (FIG. 1). Thus, user 1900 can quickly determine the combined balance of his bank accounts at banking institution 1500 through quick-balance interface 10630 of front display 10600.

Figure 11:
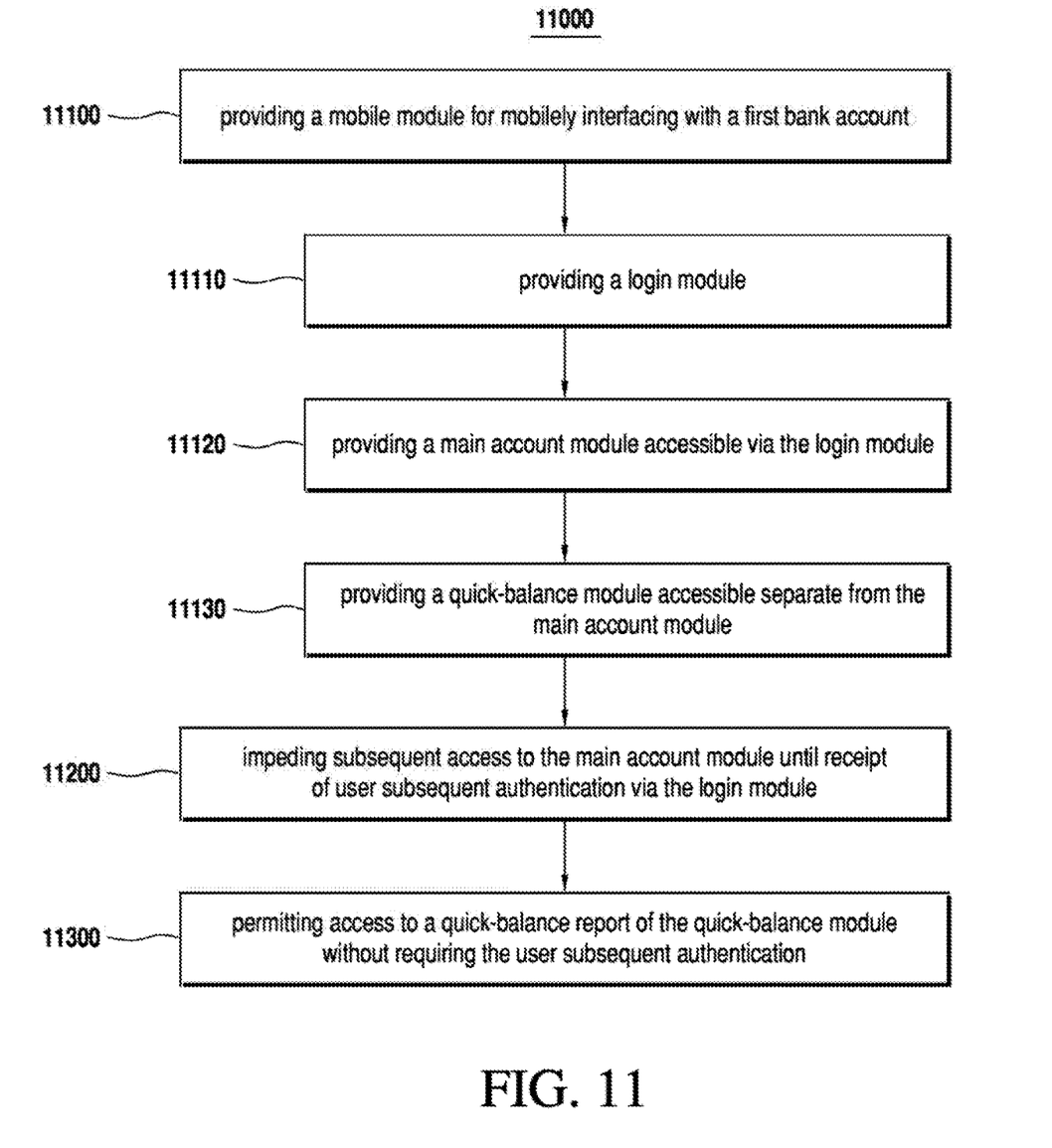
FIG. 11 illustrates a flowchart for a method fix facilitating mobile banking.

Moving on, FIG. 11 illustrates a flowchart for a method 11000 for facilitating mobile banking. In some implementations, method 11000 can implement or be part of a mobile banking system similar to mobile banking system 100 as described above.

Method 11000 comprises block 11100 for providing a mobile module for mobilely interfacing with a first bank account. In some examples, the mobile module can be similar to mobile module 1600, as described above with respect to FIGS. 1-10. The first bank account can be similar to bank account 1521 or bank account 1522 (FIG. 1), which can be accessible via bank server 1510 of banking institution 1500. The first bank account can refer to any bank account of a user, regardless of whether such bank account is primary or secondary with respect to others, or whether such bank account was created before or after other bank accounts.

Block 11100 can comprise several sub-blocks in some implementations. For instance, block 11100 can comprise sub-block 11110 for providing a login module, which can be similar to login module 4610 as described above with respect to FIGS. 4-5 and 8-10. Block 11100 can also comprise block 11120 for providing a main account module accessible via the login module, where the main account module can be similar to main account module 4620 as described above with respect to FIGS. 4 and 7. Block 11100 can further comprise providing a quick-balance module accessible separate from the main account module, where the quick-balance module can be similar to quick-balance module 4630 as described above with respect to FIGS. 4-10.

Method 11000 also comprises block 11200 for impeding subsequent access to the main account module until receipt of user subsequent authentication via the login module. In some examples, the user subsequent authentication can be as described above with respect to subsequent authentication 8611 (FIG. 8), which is required to call main display 7600 and main interface 7610 (FIG. 7) to gain access to main account module 4620.

Method 11000 further comprises block 11300 for permitting access to a quick-balance report of the quick-balance module without requiring the user subsequent authentication. In some examples, the quick-balance report can be similar to quick-balance report 4631, 4632, or 4633 of quick-balance module 4630, and can be accessed via a quick-balance interface similar to quick-balance interface 5630 (FIGS. 5, 8, 9), quick-balance interface 9630 (FIG. 9), and/or quick-balance interface 10630 (FIG. 10).

In some examples, one or more of the different blocks of method 11000 can be combined into a single block or performed simultaneously, and/or the sequence of such blocks can be changed. For example, sub-blocks 11110, 11120, and/or 11130 can be combined into a single sub-block. In the same or other examples, some of the blocks of method 11000 can be subdivided into several sub-blocks. There can also be examples where method 11000 can comprise further or different blocks. As an example, method 11000 can further comprise a block for accessing further detailed information about the first bank account, and/or for requesting transactions for the first bank account. In addition, there may be examples where method 11000 can comprise only part of the steps described above.

In some instances, the exemplary modules described above may be implemented as machine-accessible instructions utilizing any of many different programming codes stored on any combination of machine-accessible media embodied in a mobile application (e.g., an app) and/or an online application for various wired and/or wireless mobile communication devices such as handheld computers, smartphones, portable media players, tablet computers, etc. In addition or alternatively, the machine-accessible instructions may be embodied in a volatile or non-volatile memory or other mass storage device (e.g., a USB drive, a CD, or a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a flash memory, a magnetic media, an optical media, and/or any other suitable type of medium. The systems, apparatus, methods, and articles of manufacture described herein are not limited in this regard.

Although the mobile banking systems and related methods herein have been described with reference to specific embodiments, various changes may be made without departing from the spirit or scope of the present disclosure. Examples of such changes have been given in the foregoing description. Other permutations of the different embodiments having one or more of the features of the various figures are likewise contemplated. Accordingly, the specification and drawings herein are intended to be illustrative of the scope of the disclosure and are not intended to be limiting. It is intended that the scope of this application shall be limited only to the extent required by the appended claims.

The mobile banking systems and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A computing device for displaying account data from a remote server, comprising:
   a display screen;
   a set of one or more processors; and
   a memory connected to the processor and storing an application, wherein the application directs the processor to:
      present a login graphical user interface (GUI) on the display screen comprising a login control for interfacing with a login module to log in to a remote server;
      authenticate a user for a first session with the remote server through the login GUI based on a first authentication token received from the remote server;
      present an account GUI on the display screen for displaying account data associated with the user at the remote server, wherein the account GUI comprises a set of tools for interfacing with a main account module of the application to receive account data and request transactions with the remote server;
      determine whether a summarized view is to be enabled in order to obtain a second authentication token;
      determine whether the first session has ended and whether the second authentication token has been obtained;
      when the first session has ended and the second authentication token has been obtained:
         communicating with the remote server using the second authentication token to receive a summary report of the account data associated with the user at the remote server;
         modifying the login GUI to include an actuating graphical element for providing the summary report of the account data when actuated, wherein the actuating graphical element conceals the summary report of the account data;
         presenting the modified GUI comprising the actuating graphical element on the display screen; and
         upon receiving a user input through the actuating graphical element of the modified login GUI to view the summary report, displaying the summary report of the account data on the modified login GUI on the display screen.

2. The computing device of claim 1, wherein authenticating the user for the first session comprises generating the first authentication token to authenticate the user at the remote server.

3. The computing device of claim 1, wherein authenticating the user for the first session comprises communicating with the remote server to receive the first authentication token from the remote server.

4. The computing device of claim 1, wherein the account data comprises account balance data.

5. The computing device of claim 1, wherein the application further directs the processor to communicate with the remote server to modify the account at the remote server based on interactions with the set of tools.

6. The computing device of claim 1, wherein modifying the account comprises at least one of the group consisting of closing the account, opening a new account, transferring funds to the account, and transferring funds from the account.

7. The computing device of claim 1, wherein the application further directs the processor to detect the end of the first session by detecting at least one of a timing out of the first session and a user input for ending the session.

8. The computing device of claim 1, wherein the summary report comprises an account balance.

9. The computing device of claim 1, wherein the actuating element is a slide bar actuator, wherein the user input comprises sliding of the slide bar actuator to reveal the summary report of the account data.

10. The computing device of claim 9, wherein the modified login interface further comprises a second slide bar actuator, wherein actuation of the second slide bar actuator reveals a summary report of a second account associated with the user.

11. The computing device of claim 1, wherein communicating with the remote server to retrieve the summary report of the account data comprises sending the enabled second authentication token to the remote server.

12. A method for displaying account data on a mobile device, the method comprising:
   presenting a login graphical user interface (GUI) on a display screen of the mobile device comprising a login control for logging in to a remote server;
   authenticating a user for a first session with the remote server through the login GUI based on a first authentication token received from the remote server;
   presenting an account GUI on the display screen for displaying account data associated with the user at the remote server, wherein the account GUI comprises a set of tools to receive account data and request transactions with the remote server;
   determining whether a summarized view is to be enabled in order to obtain a second authentication token;
   determining whether the first session has ended and whether the second authentication token has been obtained;
   when the first session has ended and the second authentication token has been obtained:
      communicating with the remote server using the second authentication token to receive a summary report of the account data associated with the user at the remote server;
      modifying the login GUI to include an actuating graphical element for providing the summary report of the account data when actuated, wherein the actuating element conceals the summary report of the account data;
      presenting the modified GUI comprising the actuating element on the display screen; and
      upon receiving a user input through the actuating element of the modified login GUI to view the summary report, displaying the summary report of the account data on the modified login GUI on the display screen.

13. The method of claim 12, wherein authenticating the user for the first session comprises generating the first authentication token to authenticate the user at the remote server.

14. The method of claim 12 further comprising detecting the end of the first session by detecting at least one of a timing out of the first session and a user input for ending the session.

15. The method of claim 12, wherein the summary report comprises an account balance.

16. The method of claim 12, wherein communicating with the remote server to retrieve the summary report of the account data comprises sending the enabled second authentication token to the remote server.

* * * * *